US009446966B2

United States Patent
Shan

(10) Patent No.: US 9,446,966 B2
(45) Date of Patent: Sep. 20, 2016

(54) METHOD FOR FORMING METAL FLUORIDE MATERIAL

(71) Applicant: QuantumScape Corporation, San Jose, CA (US)

(72) Inventor: Jon Shan, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 175 days.

(21) Appl. No.: 14/221,957

(22) Filed: Mar. 21, 2014

(65) Prior Publication Data

US 2014/0284526 A1   Sep. 25, 2014

Related U.S. Application Data

(60) Provisional application No. 61/803,802, filed on Mar. 21, 2013.

(51) Int. Cl.
  H01B 1/06    (2006.01)
  C01G 49/10   (2006.01)
  H01M 4/58    (2010.01)
  C01G 29/00   (2006.01)
  (Continued)

(52) U.S. Cl.
  CPC ............ *C01G 49/10* (2013.01); *C01B 9/08* (2013.01); *C01G 3/04* (2013.01); *C01G 29/00* (2013.01); *C01G 37/04* (2013.01); *C01G 45/06* (2013.01); *C01G 49/00* (2013.01); *C01G 53/08* (2013.01); *H01M 4/582* (2013.01); *C01P 2002/54* (2013.01); *C01P 2002/72* (2013.01)

(58) Field of Classification Search
  CPC ...... H01M 4/136; H01M 4/364; H01M 4/04; H01M 4/139; B82Y 30/00; C01G 49/00

USPC ................. 252/506, 518.1, 519.34; 429/209, 429/218.1, 226, 523
See application file for complete search history.

(56) References Cited

U.S. PATENT DOCUMENTS 7,371,338 B2   5/2008  Amatucci
7,625,671 B2   12/2009 Amatucci
(Continued)

OTHER PUBLICATIONS

Zhang, Wei, et al., "Synthesis and characterization of in situ Fe2O3-coated FeF3 cathode materials for rechargeable lithium batteries," Journal of Materials Chemistry, 2012, vol. 22, pp. 24769-24775.
Li, Ting, et al., "Reversible Three-Electron Redox Behaviors of FeF3 Nanocrystals as High-Capacity Cathode-Active Materials for Li-Ion Batteries," J. Phys. Chem. C, 2010, vol. 114, pp. 3190-3195.

*Primary Examiner* — Khanh Tuan Nguyen
(74) *Attorney, Agent, or Firm* — Squire Patton Boggs (US) LLP

(57) ABSTRACT

The present invention is directed to processing techniques and systems of metal fluoride based material, including but not limited to nickel difluoride, copper difluoride, manganese fluoride, chromium fluoride, bismuth fluoride, iron trifluoride, iron difluoride, iron oxyfluoride, metal doped iron fluorides, e.g., $Fe_xM_{1-x}F_y$ (M=metals, which can be Co, Ni, Cu, Cr, Mn, Bi and Ti) materials. An exemplary implementation involves mixing a first compound comprising a metal material, nitrogen, and oxygen to a second compound comprising hydrogen fluoride. The mixed compound is milled to form metal fluoride precursor and a certain byproduct. The byproduct is removed, and the metal fluoride precursor is treated to form iron trifluoride product. There are other embodiments as well.

23 Claims, 4 Drawing Sheets

(51) Int. Cl.
*C01G 37/04* (2006.01)
*C01G 45/06* (2006.01)
*C01G 49/00* (2006.01)
*C01G 53/08* (2006.01)
*C01B 9/08* (2006.01)
*C01G 3/04* (2006.01)

(56) References Cited

U.S. PATENT DOCUMENTS

| | | | |
|---|---|---|---|
| 7,947,392 | B2 | 5/2011 | Amatucci et al. |
| 8,039,149 | B2 | 10/2011 | Amatucci et al. |
| 8,518,604 | B2 | 8/2013 | Amatucci et al. |
| 8,623,549 | B2 | 1/2014 | Pereira et al. |

METHOD FOR FORMING METAL FLUORIDE MATERIAL

CROSS-REFERENCES TO RELATED APPLICATIONS

This application claims priority to U.S. Provisional Patent Application No. 61/803,802, filed 21 Mar. 2013, entitled "METHOD FOR FORMING IRON FLUORIDE MATERIAL", which is incorporated by reference herein for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to processing techniques and systems of iron fluoride based materials.

For certain types of battery systems, it is often desirable to use metal fluoride material for battery components, such as positive electrodes. For high performance electrode applications as used in solid-state battery, it is often desirable to have finely processed iron fluoride material. It is to be appreciated that embodiments of the present invention are directed to methods and system for manufacturing metal fluorides focused on iron fluoride material.

SUMMARY OF INVENTION

The present invention is directed to processing techniques and systems of metal fluoride based material, including but not limited to cobalt fluoride, nickel difluoride, copper difluoride, manganese fluoride, chromium fluoride, bismuth fluoride, iron trifluoride, iron difluoride, iron oxyfluoride, metal doped iron fluorides, e.g., $Fe_xM_{1-x}F_y$ (M=metals, e.g., Co, Ni, Cu, Cr, Mn, Bi and Ti) materials. An exemplary implementation involves mixing a first compound comprising a metal material, nitrogen, and oxygen to a second compound comprising hydrogen fluoride. The mixed compound is milled to form metal fluoride precursor and a certain byproduct. The byproduct is removed, and the metal fluoride precursor is treated to form iron trifluoride product. There are other embodiments as well.

According to an embodiment, the present invention provides a method for processing a metal fluoride based material. The method includes providing a first compound comprising metal, nitrogen, and oxygen elements at a first quantity. The method also includes a second compound comprising ammonium hydrogen fluoride at a second quantity. The method further includes mixing the first compound and the second compound in a first container. The method includes providing a milling agent within the first container. The method additionally includes causing movements of the containers at a first frequency for a first duration to form a milled compound. In some embodiments, the milling process can be performed continuously. The method also includes removing the first container from the milling apparatus. The method includes processing the milled compound to obtain a segregated compound. The method also includes removing a supernatant portion from the separated compound from the second container to obtain a mixed compound, which includes a portion of metal fluoride material, a portion of nitrate material, and a portion of ammonium material. The method further includes removing substantially remove an entirety of the portion of nitrate material and the portion of ammonium material by repeatedly adding a solvent to the mixed compound and removing the portion of nitrate material and the portion of the ammonium material dissolved in the solvent. The method includes drying the portion of the metal fluoride material at a temperature of between least 20 to 200 degrees Celsius to form metal fluoride powders. The method includes subjecting the metal fluoride powders to the temperature of at least 350 degrees Celsius for a third duration of at least 2 hours in a substantially oxygen-free environment. Additionally, the method includes cooling the metal fluoride powders.

According to another embodiment, the present invention provides a method for processing a metal fluoride material. The method includes providing a first compound comprising molecules having iron material at an oxidation state of +3 or +2 and a ligand material. The first compound is characterized by a first quantity. The method also includes providing a second compound comprising ammonium hydrogen fluoride at a second quantity. The method further includes mixing the first compound and the second compound with a solution at a third quantity. The third quantity is less than three times the weight of the first quantity. The method additionally includes providing a milling agent. The method also includes milling the first and second compounds to perform a reaction to form products and by byproducts. The products comprise a portion of iron fluoride material. The byproducts include a portion of nitrate material and a portion of ammonium material. The method includes separating the products and the byproducts. The method includes removing the byproducts. The method also includes drying the products at a temperature of between least 20 to 150 degrees Celsius to form iron trifluoride powder material.

It is to be appreciated that processes and techniques according to embodiments of the present invention provide many advantages over existing techniques. More specifically, embodiments of the present invention provide an inexpensive and effective process for manufacturing metal fluoride material, which can be useful in secondary battery applications. The embodiments of the present invention can be implemented using existing apparatus. In addition, the processes and techniques of the present invention are scalable and can be used for large scale manufacturing. There are other benefits as well.

DETAILED DESCRIPTION OF THE INVENTION

Figure 1:
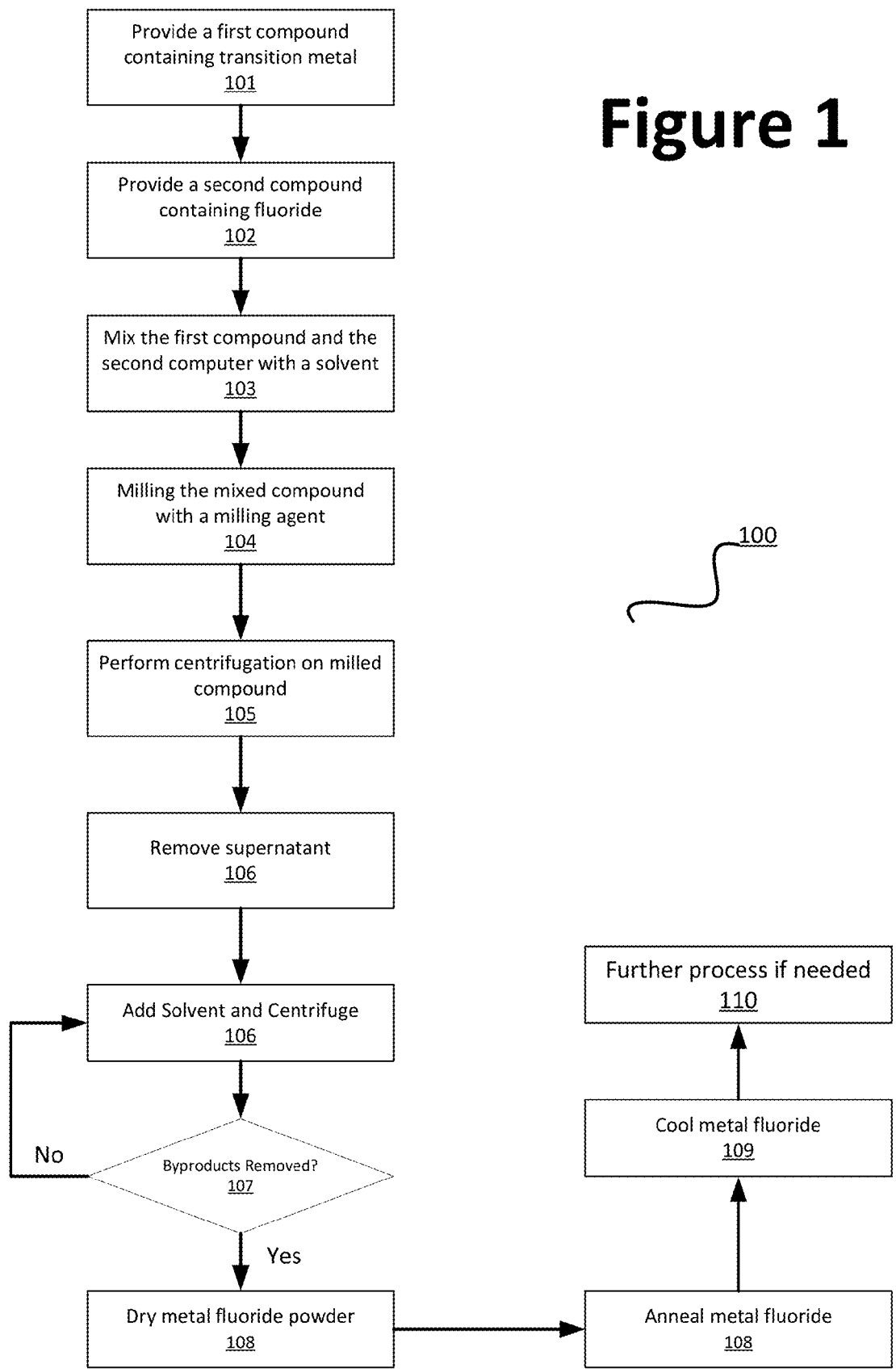
FIG. 1 is a simplified flow diagram illustrating a process for forming metal fluoride material according to embodiments of the present invention.

The present invention is directed to processing techniques and systems of metal fluoride based material, including but not limited to nickel difluoride, copper difluoride, manganese fluoride, chromium fluoride, bismuth fluoride, iron trifluoride, iron difluoride, iron oxyfluoride, metal doped iron fluorides, e.g., $Fe_xM_{1-x}F_y$ (M=metals, e.g., Co, Ni, Cu, Cr, Mn, Bi and Ti) materials. An exemplary implementation involves mixing a first compound comprising a metal material, nitrogen, and oxygen to a second compound comprising hydrogen fluoride. The mixed compound is milled to form metal fluoride precursor and a certain byproduct. The byproduct is removed, and the metal fluoride precursor is treated to form iron trifluoride product. There are other embodiments as well.

As described above, iron trifluoride material can used to manufacture rechargeable batteries. For example, iron trifluoride composition is described in U.S. patent application Ser. No. 12/025,662, filed 4 Feb. 2008, titled "Metal Fluoride And Phosphate Nanocomposites As Electrode Materials", which is incorporated by reference herein in its entirety.

One important application of metal fluorides, such as nickel difluoride, copper difluoride, manganese fluoride, chromium fluoride, bismuth fluoride, iron trifluoride, iron difluoride, iron oxyfluoride, metal doped iron fluorides, can be a battery component, especially in the application of conversion battery. For example, the metal fluorides material be used to make conversion chemistry cathodes that offer high energy capacity. Copper fluoride and iron trifluoride ($FeF_3$) are used as exemplary metal fluoride materials to illustrate some embodiments of the present invention, and it is to be understood that other types of metal fluoride materials can be used as well.

For battery related application, metal fluoride particles need to be scale to nano-size crystalline domains. For example, nano-sized particles can provide various performance advantages over large grained particles. Scaling down these particles can be accomplished by performing milling processes. Unfortunately, this process could damage the original particle quality. For example, the processes results in de-fluorination. In addition, milled particles can have agglomeration problem, which makes it difficult to modify the material to improve its electrochemical properties.

For conversion battery application, metal fluoride materials, such as copper fluoride and iron fluoride, have been demonstrated to provide high energy capacity. For example, copper fluoride can be synthesised from copper and fluorine at temperatures of 400° C. It occurs as a direct reaction.

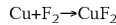

$$Cu+F_2 \rightarrow CuF_2$$

While the copper fluoride formation described above is useful, it is difficult to form $CuF_2$ with desired granularity and manufacturability for the battery related applications. Similarly, manufacturing of $FeF_3$ material can be challenging as well. For example, commercially available $FeF_3$ particles are usually synthesized by HF resources and particle size is usually large (>500 nm), such as process below:

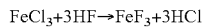

$$FeCl_3 + 3HF \rightarrow FeF_3 + 3HCl$$

Existing techniques for synthesis of nano-$FeF_3$ using surfactants usually need a large quantity of solvent. For example, 5 grams of iron fluoride material needs about 600 to 1000 mL solvent to process. It is to be appreciated that embodiments of the present invention provides a high energy milling that can largely reduce the usage of solvent and processing costs.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In various embodiments, a first compound that comprises metal material is mixed with a second compound comprising hydrogen fluoride. The mixed compound then undergoes, among other processes, a milling process to form a metal fluoride material, which can be used as a cathode material in secondary battery devices. To illustrate the process of forming metal fluoride material, copper and iron are used as an exemplary metals that are used to form copper fluoride and iron trifluoride, but it is understood that metals can be similarly processed. As an example, a specific implementation involves mixing a first compound comprising iron, nitrogen, and oxygen (e.g., iron nitrate) to a second compound comprising hydrogen fluoride (e.g., ammonium hydrogen fluoride). As another example, an implementation provides the mixing of first compound comprising copper, nitrogen, and oxygen (e.g., copper nitrate) to a second compound comprising hydrogen fluoride (e.g., ammonium hydrogen fluoride). The mixed compound is milled to form iron trifluoride precursor and a certain byproduct. The byproduct is removed, and the iron trifluoride precursor is treated. Both the first and second compounds are commercially available and can be inexpensively obtained. The process of mixing the two compounds does not involve using hydrogen fluoride (HF) material, which is a highly hazardous material. In addition, iron trifluoride material formed according to embodiments of the present invention can have electrochemical properties that are highly useful as battery components.

In an embodiment, the first compound comprises $Cu(NO_3)_2$ and the second compound comprises $NH_4HF_2$. For example, $Cu(NO_3)_2$ is widely available, and often is in hydrate form. In an alternative embodiment, the first compound comprises $Fe(NO_3)_3$ and the second compound comprises $NH_4HF_2$. In various embodiments, polymeric surfactants are used for controlling the size of iron trifluoride powders that are to be formed. For example, polymeric surfactants can be PEG, PAA, sucrose and/or others. The reaction can be carried out via a high energy wet milling process, in which a milling solvent is used. For example, milling solvent can be ethanol, and/or any solvents that can dissolve by-products of the reaction, but not dissolving the iron trifluoride precursor and product. For example, ethanol can dissolve $NH_4NO_3$, but not $CuF_2$ or $FeF_3$.

As mentioned above, the process illustrated in FIG. 1 can used for synthesizing various types of metal fluorides, in addition to iron fluoride. To manufacture other type of metal fluorides, a metal nitrate is used as the first compound, and $NH_4HF_2$ is used as the second compound. For example, to make $CuF_2$, a compound containing $Cu(NO_3)_2$ material is used. Typically, metal nitrate are commercially available, and can be prepared by using hydrogenation processes. For example, $Cu(NO_3)_2$ can be formed by reacting copper and nitric acid, which is a commercially viable and relatively inexpensive process.

The metal fluoride material, depending on the specific application, can be doped. For example, In addition to forming iron trifluoride material, the iron trifluoride material can be further processed to achieve desired electrochemical properties. For example, other metal fluorides that can improve $FeF_3$ electrochemical performance can be doped by adding corresponding metal nitrates or hydroxides. By adjusting reaction conditions, iron difluoride or iron oxyfluoride can also be formed via the above milling process. Similarly, metal fluoride(s) can be used to dope copper fluoride as well. In certain embodiments, two or more metal fluorides material are mixed together.

In various embodiments, metal trifluoride material is to be formed as nanoparticles. The particle sizes can be controlled by milling energy, time, and/or the amount of surfactant used. In an embodiment, coating material is introduced during the milling process and/or after the annealing process. Coating material can be carbon, oxides, and/or other materials.

FIG. 1 is a simplified flow diagram illustrating a process for forming metal fluoride material according to embodiments of the present invention. This diagram is merely an example, which should not unduly limit the scope of the claims. One of ordinary skill in the art would recognize many variations, alternatives, and modifications. For example, various steps as shown can be added, removed, repeated, replaced, modified, and/or overlapped. It is to be appreciated that, depending on the application, the processes 100 in FIG. 1 can be performed in less than 4 hours, which is much shorter time compared to that of conventional techniques.

In the process 100 shown in FIG. 1, a first compound is provided at step 101. The first compound comprises a metal material. In a specific embodiment, first compound consisting substantially of iron nitrate, or $Fe(NO_3)_3$ material. For example, the iron nitrate can be in powder form, or in nonahydrate form. In step 102, a second compound that contains fluoride material is provided. For example, the second compound comprises ammonium hydrogen difluoride (($NH_4HF_2$) material. For example, the second compound can be in crystalline form. In another embodiment, the first compound includes copper nitrate material. It is to be appreciated that other type(s) of metal nitrate material can be used in the first compound. Depending on the oxidation state of the metal material (e.g., +2 for Cu in $CuF_2$), the reactions between the first compound and the second compound vary.

The first compound and the second compound are mixed with a solvent in step 103. For example, the first compound, the second compound, and the solvent, which forms a mixed compound, are added to a container that is suitable for milling processes. As explained above, the solvent is capable of dissolving $NH_4NO_3$, a byproduct to be formed, but not iron trifluoride, copper fluoride, or other type of metal fluoride, such as copper fluoride. In a specific embodiment, the solvent comprises ethanol and/or water. In various embodiments, the ratio between the solvent and the precursor materials is less than 2:1. For example, in Table 1 below, the ratio between solvent (ethanol) and precursors is less than 1:1. It is to be appreciated that by using a relatively small quantity of solvent, the amount of byproducts to be removed later is significant reduced, thereby reducing the manufacturing costs and shortening the manufacturing time. Polyethylene glycol (PEG) material can be added to the solvent as well. The ratio (measured in weight) between the first compound and the second compound can be about 3~6 to 1. The ratio in weight between PEG and the compound can be about 1:30~50, if PEG is added.

Depending on the specific metal used, the stoichiometric ratio, and thus the mixing ratio, may be changed. For example, to facilitate reaction between copper (II) nitrate and ammonium hydrogen difluoride would have a stoichiometric ratio about 1:1, and thus ratio of precursor material is about 1:1 according various embodiments, depending on the molar concentration of the precursor material.

Figure 2A:
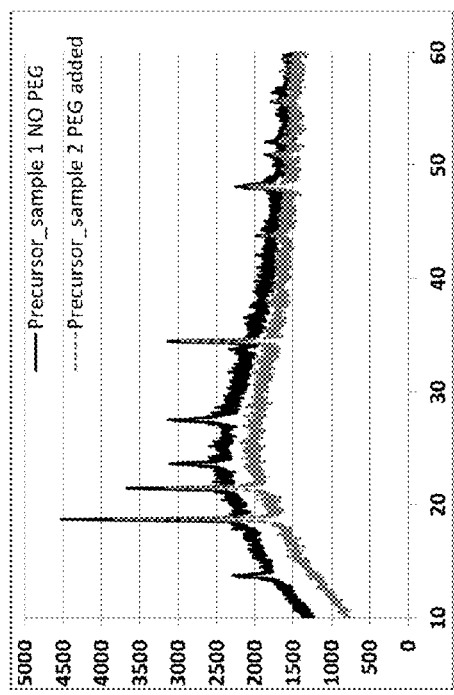
FIGS. 2A and 2B illustrate the effect of PEG material used in the processes according to embodiments of the present invention.
Figure 2B:
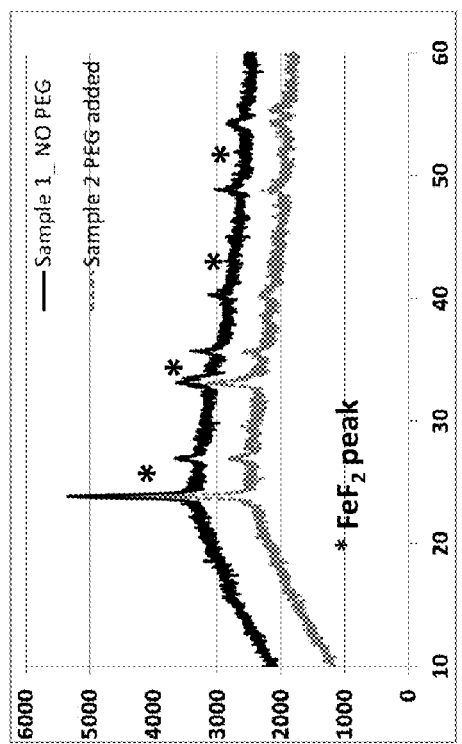

FIGS. 2A and 2B illustrate the effect of PEG material used in the processes according to embodiments of the present invention. Without adding PEG before the milling process, some fluorides might form before annealing step. After annealing, both routes produced products in similar XRD pattern.

Table 1 below illustrates the amount of material used in sample 1 and sample 2 processes according to embodiments of the present invention, as compared to conventional method:

TABLE 1

| Chemical/Items | Conventional Method (g) | Sample 1 (g) | Sample 2 (g) |
|---|---|---|---|
| $Fe(NO_3)_3 \cdot 3H_2O$ | 20.2 | 3.03 | 3.03 |
| $NH_4HF_2$ | 4.278 | 0.6407 | 0.6407 |
| PEG | 1 | 0 | 0.3 |
| Ethanol (mL) | 400 | 2 | 2 |
| Reaction time (h) | >12 | 0.3 | 0.3 |
| After centrifuge/drying | 5.5-6 | N/A | N/A |
| After anneal | 3-3.5 | 0.75 | 0.8 |
| Yield (%) | ~60 | 88 | 94 |

As illustrated in FIG. 1, a much smaller amount of ethanol is used for preparing iron trifluoride according to embodiments of the invention. For example, 2 ml of ethanol is used to produce about 0.75 g of iron trifluoride product, wherein in conventional method about 400 ml of ethanol is need to form about 3~3.5 g of iron trifluoride (after normalization, the reduction in ethanol usage is large, about 40~50×).

It is to be appreciated that that the process illustrated in FIG. 1 can process various type of metal fluoride materials used a reduced amount of material compared to conventional processes. For example, with $Cu(NO_3)_2$ hydrate as the first compound, the amount of first compound used is similarly as low as the amount of $Fe(NO_3)_3$ used, as shown in Table 1. As explained above, the actual amount of precursor material used depends on various factors, such as molar concentration, oxidation states of specific metal used, and others.

At step 104, milling process is performed for the mixed compound. In a specific embodiment, the container holding the dissolved compound is secured within a milling apparatus. A milling agent is added to the mixed compound. For example, the milling agent comprises stainless steel balls. Other types of milling agents can be used as well. The milling apparatus is specifically designed to cause rapid movement of the container and its contents. In a specific embodiment, the milling apparatus causes causing movements of the containers at least 1000 RPM (e.g., can be as high as 2000 RPM and higher) for a duration of at least 15 minutes (e.g., duration may range 15~30 minutes, and less than 90 minutes) to form a milled compound. For example, milling apparatus such as Spex™ 8000, PM100 and/or 400 and any milling machines that are able to produce product precursors via milling energy can be used. The flexibility of milling machines can be employed to scale up the synthesis to the industrial level. It is to be appreciate the milling processed performed at 104 facilitate the reaction among the precursor materials. By milling and mixing and precursor material at a high speed, precursor materials can mix at a molecular level due to rapid movement, without needing a large amount of solvent. For example, the small amount of solvent used according to embodiments of the present invention cannot cause the reaction between the precursors to take place, without the milling and mixing process performed at step 104. As shown in Table 1, using conventional method 400 ml of ethanol solution is needed for about 25 g of precursor material.

At step 105, centrifugation is performed on the milled compound. More specifically, the milling container is removed from the milling apparatus, and the milled compound is transferred to a centrifuge container. For example, the centrifuge container is a centrifuge tube. The centrifuge container is secured to a centrifuge device. For example, centrifuge container, with milled compound inside, is secured within the centrifuge device. The centrifugation is performed at a duration of at least 5 minutes at a frequency of at least 1000. In specific embodiment, centrifugation is performed at a frequency of about 3000 RPM for about 5 minutes. In another embodiment, centrifugation is performed at a frequency of about 2000 RPM and for about 10 minutes. It is to be appreciated that other frequency and/or duration are possible as well.

After centrifugation process is performed, a centrifuged compound is separated from the supernatant. For example, the centrifuged compound comprises mainly wet solid iron trifluoride precursor material with some byproducts such as ammonia and nitrate. The supernatant comprises mostly byproducts (i.e., ammonia and nitrate) dissolved in the solvent (e.g., ethanol and/or water). At step 106, the supernatant is removed from the centrifuge container. By removing the supernatant, a substantial portion, but not all, of the byproducts are removed.

To remove the byproducts and ensure the purity of the metal fluoride precursor, additional solvent is added to the solid portion of the centrifuged compound, at step 106. In an embodiment, the solvent may be ethanol and/or water. Other solvent can be used as well. The solvent, as described above, dissolves the byproduct, but does not dissolve metal fluoride. In various embodiments, a large amount (relative to the iron fluoride material) of solvent is added. After the solvent is added, centrifugation process is performed again to separate metal fluoride precursor and supernatant that comprises mostly byproducts dissolved in the solvent. The supernatant is removed again. At step 107, it determines whether a threshold amount of byproducts are removed. In a specific embodiment, the process of dissolving byproducts, preforming centrifuge, and remove the supernatant is repeated three or more times to ensure that the threshold amount of byproducts are removed.

After removing the byproducts, the metal fluoride precursor material is dried at step 108. For example, the meal fluoride precursor material is substantially in powder form, by wet with the solvent. In an embodiment, the metal fluoride precursor material is dried at a temperature of between 60 to 90 degrees Celsius. For example, if ethanol is used as solvent, a temperature between 80 to 90 degrees Celsius is suitable as the drying temperature, as the ethanol solvent typically reaches its boiling point at about 80 degrees Celsius. A temperature of 100 degrees Celsius or higher is avoided, as metal fluoride material tends to oxide at this temperature.

After drying, the metal fluoride precursor material is annealed at step 109. In various embodiments, the annealing process is performed in a substantially oxygen-free environment to avoid oxidation of metal fluoride precursor material. For example, the metal fluoride precursor material is annealed in a closed chamber, where inert gases are flowed through. The anneal process is performed at a temperature of at least 350 degrees Celsius for at least 100 minutes. In a specific embodiment, annealing is performed at a temperature of about 400 degrees Celsius for about 2 hours. For example, the metal fluoride precursor material (e.g., in powder form) is placed within a closed chamber under Ar flow and on an open surface. The open surface is high-temperature resistant and characterized by high thermal conductivity to facilitate heating up of the powdered iron fluoride material. It is to be appreciated that the annealing process improves the electrochemical properties of the metal fluoride product. For example, copper fluoride material may have an annealing temperature that is relatively lower (e.g., less than 300 degrees Celsius) than iron trifluoride material.

At step 109, the annealed metal fluoride powder is cooled. For example, the metal fluoride material can be cooled at room temperature.

At step 110, further process can be performed as needed. For example, the metal fluoride product is to be used to formed electrodes in a battery, which requires further processing.

Figure 3:
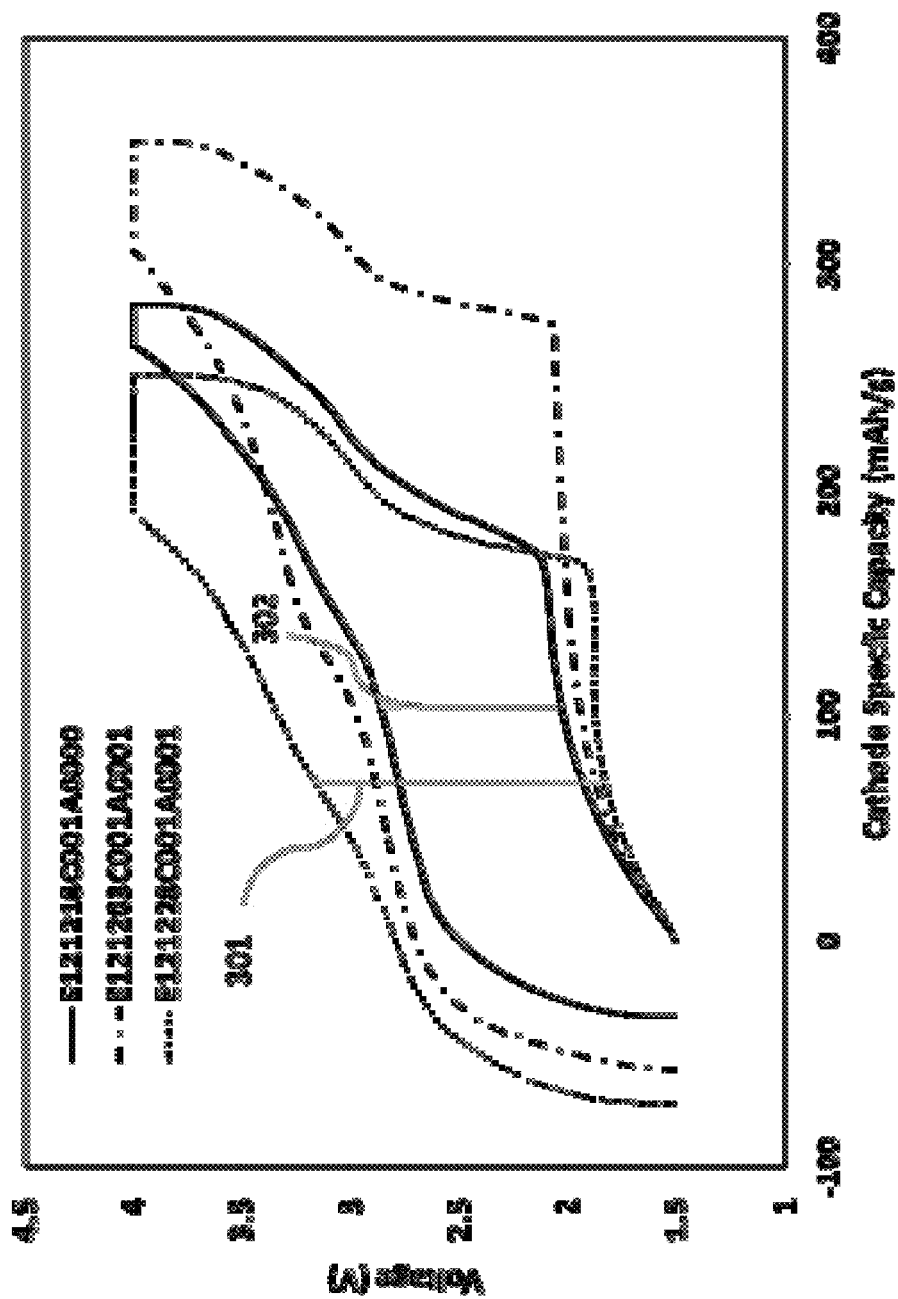
FIG. 3 is a simplified diagram illustrating battery hysteresis according to embodiments of the present invention.

It is to be appreciated metal fluoride material formed according method described according embodiments of the present invention can be used for manufacturing of rechargeable batteries that have improved performance compared to battery with metal material formed using conventional techniques. To demonstrate, $FeF_3$ material manufactured according to embodiments of the present invention is used as an example, and it is understood that other types of metal fluoride materials manufactured according to embodiments of the present invention can provide similar performance characteristics. FIG. 3 is a simplified diagram illustrating battery hysteresis according to embodiments of the present invention. This diagram is merely an example, which should not unduly limit the scope of the claims. One of ordinary skill in the art would recognize many variations, alternatives, and modifications. The line 301 illustrates the hysteresis between charge and discharge for a battery that uses $FeF_3$ material formed according to conventional techniques (e.g., aqueous formation involving HF). The line 302 illustrates the hysteresis between charge and discharge for a battery that uses $FeF_3$ material formed using the solid state synthesis according to embodiments of the present invention. As can be seen the line 302 is much shorter than the line 301, indicating a smaller battery synthesize and therefore better performance.

Figure 4:
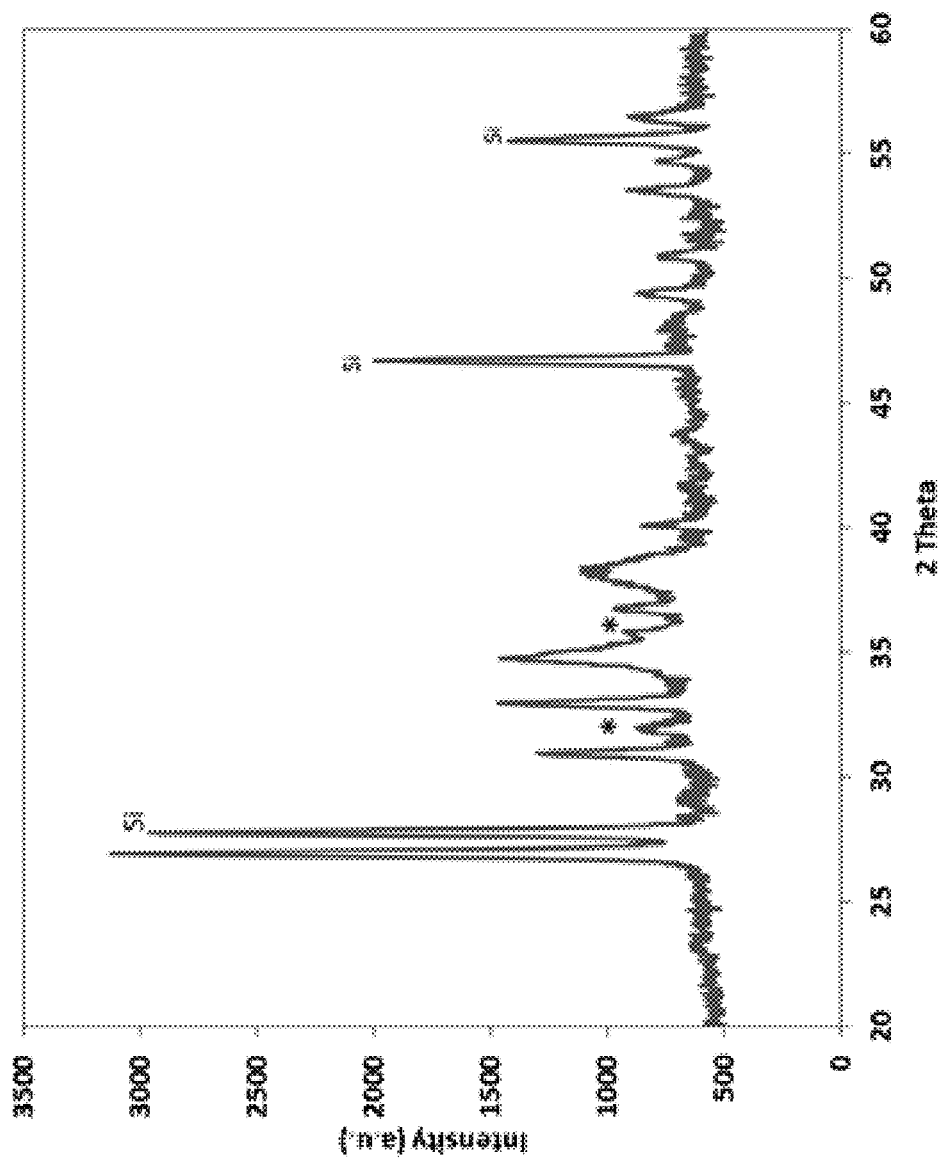
FIG. 4 is an XRD graph illustrating $CuF_2$ material synthesized according to the process illustrated in FIG. 1.

In various embodiments, other types of metal materials are process fluoride material to form metal fluoride. For example, to make copper fluoride material, the process illustrated in FIG. 1 and described above is performed, where copper material is used in lieu of iron material. More specifically, $Cu(NO_3)_2$ and $NH_4HF_2$ are mixed and milled according to the processed illustrated in FIG. 1. Depending on the specific materials and specific implementations, operating parameters (e.g., milling time, mixing ratio, annealing time, etc.) can be adjusted as needed. It is to be appreciated copper fluoride material manufactured according to FIG. 1 can be used for battery related applications. FIG. 4 is an XRD graph illustrating $CuF_2$ material synthesized according to the process illustrated in FIG. 1. The XRD graph shows that the $CuF_2$ material has a relative low level of impurity through.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for processing a metal fluoride based material comprising:
    providing a first compound comprising metal, nitrogen, and oxygen elements at a first quantity;
    a second compound comprising ammonium hydrogen fluoride at a second quantity;
    mixing the first compound and the second compound in a first container;
    providing a milling agent within the first container;
    causing movements of the containers at a first frequency for a first duration to form a milled compound;
    removing the first container from the milling apparatus;
    processing the milled compound to obtain a seperated compound;
    removing a supernatant portion from the separated compound from the first container to obtain a mixed compound, the mixed compound comprising a portion of metal fluoride material, a portion of nitrate material, and a portion of ammonium material;
    removing a portion of the nitrate material and a portion of the ammonium material by repeatedly adding a solvent to the mixed compound and removing the portion of nitrate material and the portion of the ammonium material dissolved in the solvent;
    drying the portion of the metal fluoride material at a temperature of between least 20 to 200 degrees Celsius to form metal fluoride powders;
    subjecting the metal fluoride powders to the temperature of at least 350 degrees Celsius for a third duration of at least 2 hours; and
    cooling the metal fluoride powders.

2. The method of claim 1 further comprising disengageably coupling the first container to a milling apparatus.

3. The method of claim 1 further comprising performing centrifugation on the milled compound at a second frequency for a second duration to obtain a centrifuged compound.

4. The method of claim 3 wherein the second frequency is at least 2000 RPM.

5. The method of claim 1 wherein drying the portion of the metal fluoride material is at a temperature of between least 60 to 100 degrees Celsius to form metal fluoride powders.

6. The method of claim 5 wherein the metal comprises iron or copper.

7. The method of claim 1 wherein the solvent comprises ethanol and/or water.

8. The method of claim 1 wherein the metal comprises iron, copper, cobalt, manganese, nickel, and/or bismuth.

9. The method of claim 1 wherein the metal fluoride powders have a median particle size of about 20 nm to about 100 nm.

10. The method of claim 1 further comprising mixing a coating material with the first compound and the second compound.

11. The method of claim 1 wherein the substantially oxygen-free environment comprises, helium, argon, and/or nitrogen gas.

12. The method of claim 1 wherein the solvent is added to mixed compound at least three times.

13. The method of claim 1 wherein the first compound is solid.

14. The method of claim 1 further comprising:
    providing a polymer material;
    forming an electrode using the iron fluoride material.

15. The method of claim 1 further comprising:
    providing a carbon material;
    mixing the carbon material with the metal fluoride material.

16. The method of claim 1 wherein the first compound further comprises hydrogen material.

17. The method of claim 1 wherein the first compound further comprises iron nitrate material.

18. The method of claim 1 wherein the ratio in weight between the first quantity and the second quantity is about 2:1 to 5:1.

19. The method of claim 1 wherein the milling agent comprises stainless steel or $ZrO_2$ balls.

20. The method of claim 1 wherein the first duration is between about 10 to 45 minutes.

21. The method of claim 1 wherein the second container comprises a centrifuge tube.

22. The method of claim 1 wherein the first frequency is at least 1400 RPM.

23. The method of claim 1 further comprising forming a positive electrode using the dried powder.

* * * * *